United States Patent Office 3,842,071
Patented Oct. 15, 1974

3,842,071
METHOD FOR THE PREPARATION OF
STARCH PHOSPHATE ESTERS
Martin M. Tessler, Edison, N.J., assignor to National
Starch and Chemical Corporation, New York, N.Y.
No Drawing. Filed July 11, 1973, Ser. No. 378,159
Int. Cl. C08b 19/04
U.S. Cl. 260—233.5                            13 Claims

ABSTRACT OF THE DISCLOSURE

A method for the preparation of starch phosphate esters is disclosed wherein aqueous slurries or dispersions of a starch base are reacted with an N-acylphosphoramidic acid salt. The starch products may also be prepared employing non-aqueous solvents or by means of a dry procedure.

---

This invention relates to a method for the preparation of starch phosphate esters. More particularly, the invention relates to a method for the preparation of starch phosphate esters by the reaction of an N-acylphosphoramidic acid salt with a starch base under specified reaction conditions. As herein used, the term "starch phosphate ester" means the monoester of starch and orthophosphoric acid, ar any salt or acid salt thereof.

While many methods of starch esterification to produce starch phosphate esters have been proposed and are described in the literature, until recently all of these methods involve dry reaction procedures and consist, essentially, in heat reacting starch which has been impregnated with a phosphate salt of an alkali metal, within a prescribed pH range. Thus, a representative method of the prior art for phosphorylating starch would involve impregnating starch with sodium dihydrogen phosphate (in an amount of from 2% to 4% by weight of the dry starch), at pH 4–8, drying the starch and heating at 248–266° F. (120–130° C.) for one to three hours. Starch reactions which are carried out in aqueous media are, from a large-scale production viewpoint, more efficient and economical.

It is the prime object of this invention to provide a new method for the preparation of starch phosphate esters in aqueous systems. Another object of this invention is to provide an efficient and economical reaction procedure for chemically altering the paste properties of starch. Various other objects and advantages of this invention will be apparent from the following description.

Thus, I have found that the objects of my invention may be accomplished by reacting a desired starch base, which is ordinarily suspended in water, with an N-acylphosphoramidic acid salt wherein the acyl portion consists of a group selected from the following general classes: a benzoyl radical, a haloacetyl radical, a halo substituted benzoyl radical, an alkyl substituted benzoyl radical, and an alkoxy substituted benzoyl radical; said alkyl and alkoxy groups having from 1–6 carbon atoms. The reaction is usually carried out at a temperature ranging from 68–203° F. (20–95° C.) at a pH level between 2.5 and 13.0 over periods ranging from 1 to 24 hours.

The N-acylphosphoramidic acid salts useful in preparing the starch phosphate esters of this invention correspond to the following general formula:

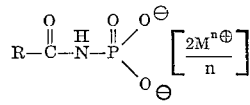

wherein R represents a radical selected from the group consisting of a halogen substituted methyl group, a halogen substituted phenyl group in which said halogen, in any group, is fluorine or chlorine or bromine; a phenyl group; an alkyl substituted phenyl group; and an alkoxy substituted phenyl group, wherein said alkyl and alkoxy groups contain from 1–6 carbon atoms; and M is a cation, e.g., sodium, potassium, calcium, ammonium, hydrogen, etc.; and $n$ represents the valence number of M.

The applicable starch base materials which may be used in preparing the starch phosphate ester products may be derived from any plant source including corn, potato, sweet potato, wheat, rice, sago, tapioca, waxy maize, sorghum, high amylose corn, or the like. Also included are the conversion products derived from any of the latter bases including, for example, dextrines prepared by the hydrolytic action of acid and/or heat; oxidized starches prepared by treatment with oxidants such as sodium hypochlorite; derivatized starches such as starch ethers and esters; and, fluidity or thin boiling starches prepared by enzyme conversion or by mild acid hydrolysis. The use of the term "starch base" is thus seen to include any amylaceous substance, whether untreated or chemically modified which, however, still retain free hydroxyl groups capable of entering into the phosphorylation reaction of this invention. If the desired product is to be a granular starch then obviously the initial starting material must be in granular form. It is to be noted that the method of this invention may also be carried out employing gelatinized starches which will result in the production of non-granular, starch phosphate esters.

In general, the preparation of the various N-acylphosphoramidic acid salts useful in the practice of this invention is well described in the literature. For example, the N-benzoylphosphoramidic acid may be synthesized by reacting benzamide with phosphorus pentachloride, followed by the addition of water, as discussed by A. W. Titherley and E. Warrall in the Journal of the Chemical Society, 95, 1143 (1909).

Additional information concerning the preparation of the various N-acylphosphoramidic acid salts may be obtained by referring to, inter alia, C. Z. Zioudron, Tetrahedron 18, 197 (1962), and A. Lapidot and D. Samuel, Journal of Chemical Society, 2110 (1962).

In more detail, a typical preparation of a starch phosphate ester in accordance with the method of this invention is carried out by admixing a selected N-acylphosphoramidic acid or its salt and water. The selected starch base is then added to the resultant mixture. The practitioner will recognize that the order in which the reagents are added to form the reaction mixture is not of particular significance and variations may be employed herein.

The amount of phosphorylating reagent used to react with the starch base may vary from about 1 to 100%, based on the weight of starch, depending on such factors as the selected starch base employed, the degree of modification which is desired in the end product, the particular phosphorylating reagent, the reaction temperature, and the pH.

The reaction temperature may vary from 68–203° F. (20–95° C.), depending on the ingredients used, particularly the starch base. For example, the preferred temperature at which a granular starch phosphorylation is carried out is from 86–125° F. (30–51.7° C.), and that for a non-granular starch phosphorylation is from 86–155° F. (30–68.3° C.).

The pH level at which the reaction is normally carried out may be from about 2.5–13 and preferably from 3.0–5.5. It is ordinarily not necessary to control the pH during the reaction. However, if it is desired to maintain a specific pH level, the pH may be controlled by the periodic addition of a base solution such as sodium hydroxide or any other suitable base, e.g., calcium hydroxide, potassium hydroxide, tetramethylammonium hydroxide, sodium carbonate, etc. or an acid solution such as dilute sulfuric acid or dilute hydrochloric acid or dilute acetic acid or any other suitable acid. The initial pH of the reaction mixture will dictate whether acid or base is required. Reaction time will vary from about 1 hour to 24 hours depending on such factors as the reactivity of the reagent used, the amount of reagent used, the temperature employed, etc. After completion of the reaction, the pH of the reaction mixture is preferable adjusted to a pH of from about 5.0 to 7.0 using any common acid such as hydrochloric acid, sulfuric acid, acetic acid, etc. or common base such as aqueous sodium hydroxide. The pH of the reaction will determine whether acid or base is required. The resultant starch product is recovered by filtration and washed free of residual salts with water, and is thereafter dried. Alternatively, the washed product may be drum dried, or spray dried, or gelatinized and isolated by alcohol precipitation or freeze drying.

While aqueous suspensions are preferred for use herein, the reaction may be carried out, if desired, in a non-aqueous liquid medium by suspending the starch base in any common inert, organic solvent such, for example, as acetone, p-dioxane, tetrahydrofuran, etc. and then adding the required amount of the N-acylphosphoramidic acid salt thereto.

In essence, the reaction by which the starch phosphate esters of this invention are produced may be typically illustrated as follows:

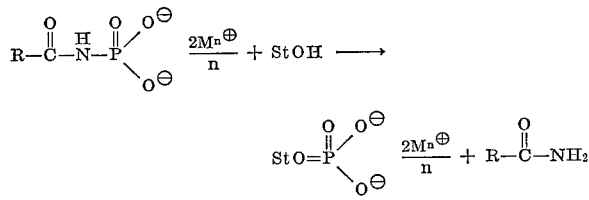

wherein StOH represents the starch molecule, and R, M and $n$ are as defined hereinabove. This is a schematic equation which describes the chemical changes occurring during the reaction. The practitioner will recognize that the starch molecule is a polymer of glucose which contains three free hydroxyl groups per anhydroglucose unit in the polymer. (The non-reducing end glucose units contain four free hydroxyl groups.) Each of these hydroxyl groups can react as indicated in this equation. It is also known that the relative reactivity of each of the hydroxyl groups is not equivalent, some being more reactive than others, and that many of the hydroxyl groups from the same starch molecule will react to give the products of this invention.

If desired, the starch esters of this invention may also be prepared by a dry process. In carrying out a typical dry procedure, the N-acylphosphoramidic acid or its salt is added to an aqueous slurry of starch, and the pH of the resulting solution adjusted to 2.5–12.0. The starch is thereafter dried to about a 10% moisture content. The drying of the starch may be carried out by any suitable conventional method. The resulting dried mixture heated (as by placing in an oven) at temperatures ranging from about 95° to 311° F. (35–155° C.). The reaction period (i.e. heating time) will vary with respect to the N-acylphosphoramidic acid or its salt employed, the selected temperature, etc. Reaction periods ranging from about 30 minutes to 10 hours have been found sufficient in most instances, however, and at the end of the reaction period, the treated starch is allowed to cool. If removal of salts and organic by-products is desired, then the starch is slurried in water. The pH of the slurry is adjusted to from 5.0 to 7.0 and the starch product recovered from the slurry by filtration, washed free of residual salts with water and isolated in a manner such as previously described above.

It can be appreciated by the practitioner that a large number of variations may be easily effected in reacting the starch base with the described N-acylphosphoramidic acid salts in accordance with the aqueous, non-aqueous, or dry reaction procedures described above without departing from the general limitations set forth therein.

Starch phosphate esters may conveniently be divided into two classes. One class comprises monoesters of orthophosphoric acid, wherein only one of the three acidic functions of the acid is esterified with one starch molecule. A second class of starch phosphate esters comprises mixtures of mono-, di- and triesters of orthophosphoric acid in which one, two, or three of the acidic functions of the orthophosphoric acid are esterified with starch molecules. The latter starch products are inhibited or cross-bonded starches since the formation of a di- or triester bond yields a cross-bonded network in which two or three starch segments are bonded together. This cross-bonding is known to inhibit the granule swelling power of such starches when cooked in water.

The starch products of this invention are believed to be the monoesters of orthophosphoric acid by virtue of their being substantially free of inhibition. The absence of inhibition may be determined by a "sediment volume test," a sensitive test for determining the presence or lack of inhibition. In this procedure, an aqueous dispersion of the starch being tested in a concentration of 0.1%, by weight, is cooked on a boiling water bath for about 20 minutes. The cooked dispersion is then cooled and allowed to stand at room temperature in a graduated vessel, such as a 100 ml. graduated cylinder, for a period of about 16 hours. A clear or slightly cloudy dispersion with no layer formation indicates an absence of inhibition. If the starch is inhibited, the cooked dispersion will separate into layers of a clear liquid and an opaque, swollen paste. In cases of extreme inhibition, the starch will completely settle out of solution in the form of a sediment. The sediment constitutes insoluble granules of starch whose swollen volumes are relative to the degree of inhibition of the starch being tested. The starch phosphate esters of this invention yielded very clear dispersions without any sediment formation, indicating the absence of substantial inhibition.

The starch phosphate esters prepared by the method of this invention may be employed as food thickeners in such products as soups, and in canned vegetables and fruits, where a thick-bodied, creamy, relatively clear thickening agent is preferable instead of an opaque, gel-like agent which is obtained with untreated corn and many other cereal starches. Cationic starches which in addition have been also phosphorlyated by the method of this invention are useful in the manufacture of paper. These starches are ordinarily incorporated with the stock during the manufacture of paper and such addition results in improved retention of pigments, increased strength and other desirable properties. The application of these cationic, phosphorylated starches in papermaking is described in U.S. 3,459,632, patented Aug. 5, 1969. The starch products of this invention may find use as foundry core binders, textile sizes, and ore refining additives.

The following examples will further illustrate the embodiment of the present invention. In these examples, all parts are given by weight unless otherwise noted.

EXAMPLE I

This example illustrates the synthesis of an N-benzoyl-phosphoramidic acid salt and the usefulness of said salt in the preparation of starch phosphate ester in accordance with the method of this invention.

Part I—Preparation of the Phosphorylating Reagent

A mixture comprising 62.5 parts of phosphorus pentachloride, 36.3 parts of benzamide, and 132 parts of benzene was stirred and heated at 50° C. for 30 minutes. The resulting solution was cooled to about 10° C., and 5.4 parts of distilled water were added to said solution. Stirring was continued for 20 minutes, whereupon the benzene-insoluble N-benzoylphosphoramidic dichloride was recovered by filtration, washed with ice water, and dried over a 24 hour period in a desiccator. The yield of this product was 53.5 parts (74.8% of theoretical) and the product had a melting point of from 109–111° C.

Twenty-five parts of the above described reaction product were then dissolved in 118.5 parts of acetone, and 3.76 parts of distilled water were added to the solution. The acetone was evaporated, and the crystalline N-benzoylphosphoramidic acid was dried over a 48 hour period in a desiccator containing sulfuric acid. The yield of this product was 17.5 parts (83.0% of theoretical). Portions of this product were then used to prepare three starch phosphate esters as set forth below.

Part II—Preparation of the Starch Phosphate Esters

Product A.—To a slurry comprising 50 parts of corn starch suspended in 65 parts of water, 3.75 parts of N-benzoylphosphoramidic acid were added. This mixture was stirred, and the pH was adjusted to 4.5 by the addition of a 3.0% aqueous, sodium hydroxide solution. This mixture was then agitated for 16 hours at 40° C., and cooled to about 23° C., whereupon the pH level was raised to 5.0. The starch product was then recovered by filtration, washed three times with distilled water, and air dried. On analysis, the resulting starch phosphate ester was found to contain 0.04 percent, by weight, of phosphorus.

The procedural steps of Part II above were repeated twice the preparations of two additional starch phosphate esters, B and C, with exceptions as follows:

Product B.—Using corn starch and N-benzoylphosphoramidic acid in the same amounts, the reaction described in Part II, supra, was repeated at a pH of 8.0. This starch phosphate ester contained 0.04 percent, by weight, of phosphorus.

Product C.—In this instance, 3.75 parts of N-benzoylphosphoramidic acid were added to a solution comprising 15 parts of sodium sulfate in 65 parts of distilled water, neutralizing this solution to a pH of 7.0 by the addition of a 50% aqueous sodium hydroxide solution, adding 1.5 parts of sodium hydroxide and 50 parts of corn starch, and agitating the resulting mixture for 16 hours at 40° C. The pH at which this reaction was carried out was 11.5, and the starch phosphate ester thus obtained had 0.03 percent, by weight, of phosphorus.

The results of the preparations of products A and B indicate that the reactions in accordance with this invention may be carried out at slightly acidic or slightly alkaline pH levels without the use of additional ingredients and that of product C, at a more alkaline pH level with the aid of a neutral salt to prevent the gelatinization of the starch base.

EXAMPLE II

This example illustrates the preparation of a non-granular starch phosphate ester, in accordance with the method of this invention employing a previously gelatinized starch base and a phosphorylating agent prepared as follows:

Part I—Preparation of the Phosphorylating Agent

A total of 93.5 parts of N-benzoylphosphoramidic dichloride was slowly stirred into 100 parts of distilled water, while the temperature of the thusly forming solution was maintained below 40° C. and the pH, between 11 and 12 by the addition of 30% aqueous sodium hydroxide solution. About 245.0 parts of the sodium hydroxide solution were required over a period of 45 minutes. After completion of the addition, stirring was continued for one hour. Then 100 parts of the resulting solution were evaporated, under vacuum, to yield 32.7 parts of a dry solid which consisted of about 32.3% of sodium chloride and 67.7% of disodium N-benzoylphosphoramidate.

A total of 30 parts of waxy maize which had been previously acid converted to a degree known in the trade as 85 fluidity was added to 300 parts water, and the resulting suspension was heated in a boiling water bath for a period of 20 minutes. The resulting starch dispersion was cooled to room temperature and a mixture of 20.3 parts disodium N-benzoylphosphoramidate and 9.7 parts sodium chloride as prepared above was added. The pH was adjusted to 4.5 with 10% hydrochloric acid and the dispersion was then agitated for 20 hours at 40° C. The reaction product was dialyzed against distilled water for a period of twenty four hours and the starch was isolated by precipitation from ethyl alcohol. On analysis. the resultant starch phosphate ester contained 0.21% phosphorus, by weight.

EXAMPLE III

This example illustrates additional preparations of starch phosphate esters, using varied phosphorylating agents, in accordance with this invention.

Each of five starch phosphate esters of a series, A–E, were prepared as follows:

The amount of the particular phosphorylating agent intermediate was slowly stirred into an amount of distilled water as indicated in Table No. 1. During the mixing, the pH was controlled between 11–12 by the addition of 50% aqueous sodium hydroxide, as called for, and the temperature was maintained below 40° C. Upon completion of the addition, the resulting solution was stirred for about 15–20 minutes, whereupon the pH became constant. This pH, ranging from 11–12, was then lowered to 9.0 by the addition of 10% aqueous hydrochloric acid. Then an amount of corn starch was added to each of the reaction mixtures of samples A, B, D, and E; a corn starch which had been treated with 7.5% propylene oxide and 0.006% epichlorohydrin was used in the preparation of sample C. Stirring was continued, as the pH of this slurry was adjusted to 4.5 by the addition of 10% aqueous hydrochloric acid solution. The resulting slurry was agitated for 16 hours at 40° C. and cooled to about 23° C., at which point. the pH was lowered to 3.0. The starch product was then recovered by filtration, washed three times with distilled water and, once with ethanol, and dried in the same manner utilized in Example I, supra. The respective ingredients and the amounts thereof and the results of the phosphorus analyses are presented in Table No. 1 below.

TABLE NUMBER 1

| Sample | Amount of intermediate phosphorylating agent | Parts Water | Amount of starch | Percent phosphorus |
|---|---|---|---|---|
| A | 4.0 parts of N-(p-methylbenzoyl) phosphoramidic dichloride. | 50 | 40 | 0.10 |
| B | 10.0 parts of N-(o-ethoxybenzoyl) phosphoramidic dichloride. | 65 | 50 | 0.03 |
| C | 4.3 parts of N-(m-methoxybenzoyl) phosphoramidic dichloride. | 65 | 50 | 0.05 |
| D | 1.0 pert of N-(o-fluorobenzoyl) phosphoramidic dichloride. | 25 | 20 | 0.06 |
| E | 1.6 parts of N-fluoroacetyl phosphoramidic dichloride. | 25 | 20 | 0.07 |

The data summarized above indicate that various salts of N-acylphosphoramidic acid may be used, within the prescribed concentration range with respect to the starch base, in the preparation of the starch phosphate esters, in accordance with this invention.

EXAMPLE IV

This example illustrates the preparation of additional starch phosphate esters, in accordance with this invention, employing varied reaction conditions.

Variation in Temperature.—To make two samples, identified as samples F at 50° C. and G at 23° C., the following procedure was utilized, in each case:

An aqueous solution containing about 10.6% sodium chloride and 22.1% of disodium N-benzoylphosphoramidate was prepared in the manner described in Example II hereinabove. A total of 25 parts of this solution was added to a slurry comprising 50 parts of waxy maize starch suspended in 40 parts of distilled water. The pH level of each solution was adjusted to 4.5 with 10% aqueous hydrochloric acid, and the resulting solutions were then agitated for an eight hour period at the respective temperature. Upon completion of the reaction, each starch phosphate was recovered by filtration, washed three times with distilled water and once with ethanol, and oven dried. On analysis, sample F was found to contain 0.06 percent of phosphorus, by weight, and that of sample G, 0.06 percent of phosphorus, by weight, also.

Variations in pH Level.—In a series of starch phosphate preparation, H–M, each carried out in a manner essentially the same as that employed above, corn starch was used. In all cases, the reaction period was 16 hours and the temperature, 40° C. At the completion of the reaction period, each starch phosphate ester was recovered, washed, and dried as described above. The respective pH levels at which each reaction was conducted and the percent phosphorus analyses obtained therefrom are as follows:

| Sample | pH level | Percent phosphorus |
|---|---|---|
| H | 3.0 | 0.11 |
| I | 4.5 | 0.08 |
| J | 6.0 | 0.06 |
| K | 7.5 | 0.07 |
| L | 9.0 | 0.06 |
| M | 11.0 | 0.06 |

Variation in Reaction Time.—In a series of starch phosphate ester preparations, N–Q, each carried out in a manner essentially the same as that employed above, corn starch, which had been oxidized with sodium hypochlorite to a degree known in the trade as 75 fluidity, was employed as the starch base. In all cases, the reaction temperature was maintained at 40° C. and the pH level, at 4.5. At the completion of the particular reaction period, each starch phosphate ester was recovered, washed, and dried as described above. The respective reaction times and the percent phosphorus analyses results are as follows:

| Sample | Reaction time (hours) | Percent phosphorus |
|---|---|---|
| N | 16.0 | 0.06 |
| O | 8.0 | 0.07 |
| P | 4.0 | 0.06 |
| Q | 1.0 | 0.05 |

EXAMPLE V

This example illustrates the method of this invention utilizing a non-aqueous solvent system.

A total of 5 parts of an anhydrous salt mixture consisting of 32.3% sodium chloride and 67.7% disodium N-benzoylphosphoramidate, prepared as in Example II, was dissolved in 10 parts distilled water and the pH of the solution adjusted to 4.5 with 10% aqueous hydrochloric acid. The resulting solution was added to a slurry of 50 parts corn starch in 100 parts acetone and the mixture heated at reflux (56.5° C.) with agitation for six hours. The mixture was cooled at room temperature and the starch isolated by filtration. The starch was washed three times with distilled water at pH 3.0 and one time with ethanol and air dried. The resulting product contained 0.18% phosphorus, by weight. When a portion of the starch phosphate ester was gelatinized by heating a suspension of the starch ester in a boiling water bath, a paste was formed of much greater stability, as compared to untreated corn starch.

EXAMPLE VI

This example illustrates the preparation of a non-granular starch phosphate ester in accordance with the method of this invention employing a previously, gelatinized starch base and reacting at relatively high temperatures.

A total of 25 parts waxy maize which had been previously acid converted to a degree known in the trade as 85 fluidity was added to 100 parts water, and the resulting suspension was heated in a boiling water bath for a period of 20 minutes. The resulting starch dispersion was cooled to 35° C. and 25 parts of a mixture of 32.3% sodium chloride and 67.7% disodium N-benzoylphosphoramidate as prepared in Example II was added. The pH was adjusted to 4.5 with 10% hydrochloric acid and the dispersion was agitated for seven hours at 95° C. The reaction mixture was cooled to room temperature, purified by dialysis, and the starch product isolated by precipitation from ethyl alcohol. On analysis the starch phosphate ester was found to contain 0.31% phosphorus, by weight.

EXAMPLE VII

This example illustrates the method of this invention in preparing a starch phosphate which contains cationic substituent groups.

A total of 1,000 parts of corn starch, 1,250 parts of water, 40 parts of calcium hydroxide and 40 parts of diethylaminoethylchloride hydrochloride were combined in a suitable container. The mixture was allowed to react with agitation at room temperature for a period of 16 hours. At the completion of the reaction period, the pH of the mixture was adjusted by 3.0 by the addition of hydrochloric acid. The resultant starch product was recovered by filtration, washed with distilled water, and air dried. On analysis, the product was found to contain 0.31% nitrogen, by weight.

In order to phosphorylate the above prepared diethylaminoethyl ether of corn starch, 5.0 parts of N-benzoylphosphoramidic acid was added to a slurry of 50.0 parts of the diethylaminoethyl ether of corn starch described above in 65 parts water and the pH adjusted to 4.5 with 3.0% aqueous sodium hydroxide. The resultant aqueous slurry was agitated for a period of 16 hours at 40° C. and then cooled. The pH of the cooled slurry was 5.0 and the starch product was isolated by filtration, washed three times with distilled water, and air dried. On analysis, the starch product was found to contain 0.15% phosphorus, by weight.

An aqueous suspension of the thus prepared starch in a concentration of 0.1%, by weight, was cooked in a boiling water bath for a period of 20 minutes. The cooked dispersion was then allowed to stand in a 100 ml. graduated cylinder at room temperature for a period of about 16 hours. The resultant dispersion remained very clear and no sediment was observed indicating that no inhibition of the starch had taken place.

The starch product as described above contains cationic as well as phosphate ester (anionic) groups, and is particularly useful in the manufacture of paper. The described starch product was added to bleached sulfite pulp at a concentration of 0.2%, based on the weight of dry pulp, in a conventional papermaking process. Pigment retention values were determined to show the effect of the starch product at pH levels of 4.6, 6.0 and 7.6. Paper sheets were prepared from each of the three pulps by means of the William Standard Sheet Mold and were thereafter tested for titanium-dioxide pigment retention by the method described in TAPPI Standard #T413 m.58. Pigment retention values employing the starch product which had been substituted to contain only the cationic group (the starch product prepared above prior to the reaction with the phosphorylating reagent) were also determined in an identical manner for comparison purposes. The results of these pigment retention determinations are summarized in the table below.

TABLE NUMBER 2

| Starch product employed | Percent titanium dioxide retention at pH | | |
|---|---|---|---|
| | 4.6 | 6.0 | 7.6 |
| Phosphorylated diethylaminoethyl ether of starch (prepared above) | 53 | 73 | 53 |
| Diethylaminoethyl ether of starch (prepared above) | 40 | 54 | 55 |

The above data illustrate the improved pigment retention values which are obtained with the phosphorylated cationic starch as compared with a cationic starch at pH 4.6 and 6.0.

EXAMPLE VIII

This example illustrates the use of N-chloracetylphosphoramidic acid in preparing a starch phosphate ester which also contains cationic substituent groups.

A total of 2,000 parts corn starch, 2500 parts water, 80 parts calcium hydroxide, and 80 parts diethylaminoethylchloride hydrochloride were combined and allowed to react with agitation for 16 hours at 40° C. At the completion of the reaction, the pH was adjusted to 3.0 with hydrochloric acid. The resultant starch product was recovered by filtration, washed three times with water, and dried. On analysis, the product was found to contain 0.30% nitrogen, by weight.

A total of 50 parts of the diethylaminoethyl ether derivative of corn starch described above was added to 62.5 parts water which contained 4.4 parts sodium chloride and 8.1 parts disodium salt of N-chloracetylphosphoramidic acid. The pH was adjusted to 4.5 with hydrochloric acid and the slurry was agitated for 16 hours at 40° C. The mixture was then cooled to room temperature and the pH raised to 5.0 with 3.0% aqueous sodium hydroxide. The starch was recovered by filtration, washed three times with distilled water and dried. On analysis, the starch phosphate ester was found to contain 0.09% phosphorus, by weight.

The starch product as described above was evaluated for pigment retention as described in Example VII. Pigment retention values employing the starch product which has been substituted to contain only the cationic group (the starch product prepared above prior to the reaction with the phosphorylating reagent) were also determined in an identical manner for comparison purposes. The results are set forth in Table No. 3 below.

TABLE NUMBER 3

| Starch product employed | Percent titanium dioxide retention at pH | | |
|---|---|---|---|
| | 4.6 | 6.0 | 7.6 |
| Phosphorylated diethylaminoethyl ether of starch (prepared above) | 53 | 74 | 57 |
| Diethylaminoethyl ether of starch (prepared above) | 48 | 54 | 59 |

The data summarized above further illustrate the usefulness of starch bases containing cationic groups in the preparation of starch phosphate esters according to this invention.

EXAMPLE IX

This example illustrates the preparation of a starch phosphate ester, in accordance with this invention, whereby a starch base having cationic substituent groups is phosphorylated at a high pH level controlled by the use of calcium hydroxide.

A total of 6.0 parts of a mixture of 32.3% sodium chloride and 67.7% disodium N-benzoylphosphoramidate as prepared in Example II was added to a slurry of 50.0 parts of the diethylaminoethyl ether derivative of corn starch as prepared in Example VII and 1.5 parts calcium hydroxide in 75 parts water. The slurry was reacted with agitation at 40° C., for 16 hours. The pH at the end of the reaction was 12.0. The pH was then lowered to 3.0 with 10% aqueous hydrochloric acid, the starch washed three times with water, and dried. On analysis, the product was found to contain 0.04% phosphorus, by weight.

The starch product as described above was evaluated for pigment retention as described in Example VII. Pigment retention values employing the starch product which has been substituted to contain only the cationic group (the starch product prior to the reaction with the phosphorylating reagent) was also determined in an identical manner for comparison purposes. The results are summarized in the table below:

| Starch product employed | Percent titanium dioxide retention at pH | | |
|---|---|---|---|
| | 4.6 | 6.0 | 7.6 |
| Phosphorylated diethylaminoethyl ether of starch (prepared above) | 49 | 69 | 54 |
| Diethylaminoethyl ether of starch | 41 | 58 | 56 |

The above data illustrate the improved pigment retention values which are obtained with the phosphorylated cationic starch as compared with a cationic starch at pH 4.6 and 6.0.

EXAMPLE X

This example illustrates the method of this invention utilizing a dry reaction procedure.

To a slurry comprising 50.0 parts of corn starch suspended in 65.0 parts of water there was added 7.5 parts of a mixture consisting of 32.3% sodium chloride and 67.7% of disodium N-benzoylphosphoramidate. The pH of the resulting slurry was then adjusted to 4.5 by the addition of 10% hydrochloric acid, and the thusly treated starch was recovered by filtration and air dried to a moisture content of about 12%. The dried starch was heated over a period of 7.5 hours in an oven set at 100° C., starch product was thereafter cooled to about 23° C. and a portion thereof was washed several times with 0.1 N nitric acid. On analysis, said portion of the starch product was found to contain 0.20% phosphorus, by weight.

EXAMPLE XI

This example illustrates the preparation of a starch phosphate ester which also contains quaternary amine substituent groups.

Corn starch was treated with the reaction product of epichlorohydrin and trimethylamine as described in Example IV of U.S. Pat. No. 2,876,217 to yield a quaternary amine starch derivative containing 0.30% by weight, of nitrogen (dried basis). A total of 50 parts of the resulting 3 - (trimethylammonium chloride)-2-hydroxypropyl ether derivative of corn starch was treated with 5 parts of N-benzoylphosphoramidic acid as described in Example VII hereinabove to form a phosphorylated, quaternary amine derivative of corn starch containing 0.06% phosphorus, by weight.

Summarizing, it is thus seen that this invention provides a novel method for the preparation of starch phosphate esters. Moreover, the invention provides an efficient and economical reaction procedure for chemically altering the paste properties of starch.

Variations may be made in proportions, procedures and materials without departing from the scope of this invention which is defined by the following claims.

What is claimed is:

1. A method for the preparation of starch phosphate esters comprising the steps of:

(a) reacting a starch base with a salt of an N-acylphosphoramidic acid corresponding to the general structural formula:

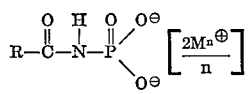

wherein R represents a radical selected from the group consisting of a halogen substituted methyl group, a halogen substituted phenyl group in which said halogen is any one of the following: fluorine or chlorine or bromine; a phenyl group; an alkyl substituted phenyl group, an alkoxy substituted phenyl group; said alkyl and alkoxy groups having from 1–6 carbon atoms; and M is a cation, and $n$ represents the valence number of M;
  (b) isolating the resulting starch product
    wherein said reaction is conducted in an aqueous medium at a pH level of from 2.5–13, and
    wherein said reaction is conducted at a temperature of from about 68–203° F. for a period of from 1 to 24 hours.

2. The method of claim 1, wherein said reaction is conducted in an aqueous medium at a pH level of from 2.5–13.

3. The method of claim 1, wherein said reaction is conducted at a temperature of from about 68–203° F. for a period of from 1 to 24 hours.

4. The method of claim 1, wherein said starch base is reacted with a monosodium salt of N-benzoylphosphoramidic acid.

5. The method of claim 1, wherein said starch base is reacted with a monosodium salt of N-chloroacetylphosphoramidic acid.

6. A method for the preparation of starch phosphate esters comprising the steps of:
  (a) reacting a starch base with a salt of an N-acyl-phosphoramidic acid corresponding to the general structural formula:

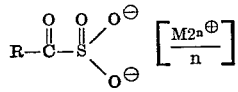

where R represents a radical selected from the group consisting of a halogen substituted methyl group, a halogen substituted phenyl group in which said halogen is any one of the following: fluorine or chlorine or bromine; a phenyl group; an alkyl substituted phenyl group, an alkoxy substituted phenyl group; said alkyl and alkoxy groups having from 1–6 cation atoms; and M is a cation, and $n$ represents the valence number of M;
  (b) isolating the resulting starch product
    wherein said reaction is conducted in a non-aqueous medium.

7. The method of claim 6, wherein said reaction is conducted employing a substantially dry reaction medium.

8. The method of claim 1, wherein said starch base is a gelatinized starch.

9. The method of claim 1, wherein said starch base is a granular starch.

10. The method of claim 1, wherein said starch base contains amine substituent groups.

11. The method of claim 1, wherein said starch base contains cationic substituent groups.

12. The method of claim 1, wherein said starch base contains diethyl aminoethyl groups.

13. The method of claim 1, wherein said starch base contains 3-(trimethylammonium chloride) - 2 - hydroxypropyl ether groups.

References Cited
UNITED STATES PATENTS

| | | | |
|---|---|---|---|
| 2,884,412 | 4/1959 | Neukom | 260—233.5 |
| 2,884,413 | 4/1959 | Kerr et al. | 260—233.5 |
| 3,459,632 | 8/1969 | Caldwell et al. | 260—233.5 |
| 3,539,553 | 11/1970 | Lloyd | 260—233.5 |
| 3,553,194 | 1/1971 | Verbanac et al. | 260—233.5 |
| 3,562,103 | 2/1971 | Moser et al. | 260—233.5 |
| 3,719,662 | 3/1973 | Tessler | 260—233.5 |

MELVYN I. MARQUIS, Primary Examiner